United States Patent
Bush et al.

(10) Patent No.: US 7,303,179 B2
(45) Date of Patent: Dec. 4, 2007

(54) SPLIT PACKING FOLLOWER FOR USE WITH VALVES

(75) Inventors: Donald R. Bush, Marshalltown, IA (US); Michel K. Lovell, Marshalltown, IA (US); Richard B. Eberhart, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 24 days.

(21) Appl. No.: 11/083,503

(22) Filed: Mar. 18, 2005

(65) Prior Publication Data
US 2006/0208211 A1    Sep. 21, 2006

(51) Int. Cl.
*F16K 31/44* (2006.01)
(52) U.S. Cl. ............................. 251/214; 277/519
(58) Field of Classification Search ............ 251/214; 277/510, 511, 519; 137/315.28
See application file for complete search history.

(56) References Cited

U.S. PATENT DOCUMENTS

| | | | | |
|---|---|---|---|---|
| 458,453 | A | * | 8/1891 | Goodrich .................. 277/511 |
| 468,453 | A | * | 2/1892 | Goodrich .................. 68/22 R |
| 766,093 | A | * | 7/1904 | Albrand ................... 277/519 |
| 1,307,901 | A | * | 6/1919 | Farland et al. ............ 277/513 |
| 1,798,268 | A | * | 3/1931 | Mellor ..................... 277/529 |
| 2,968,505 | A | * | 1/1961 | Scaramucci ............... 277/330 |
| 5,049,031 | A | * | 9/1991 | Mintenko et al. .......... 415/112 |
| 6,116,573 | A | * | 9/2000 | Cornette et al. ........... 251/214 |
| 6,622,987 | B2 | * | 9/2003 | Sterud ..................... 251/214 |
| 6,886,805 | B2 | * | 5/2005 | McCarty ................... 251/214 |

FOREIGN PATENT DOCUMENTS

| | | |
|---|---|---|
| EP | 0672851 A2 | 9/1995 |
| JP | 63195483 | 8/1988 |
| JP | 01030973 | 2/1989 |
| JP | 07248065 | 9/1995 |
| JP | 11051242 | 2/1999 |

OTHER PUBLICATIONS

International Search Report for PCT/US2006/003504, Jan. 31, 2006, 4 pages.
Written Opinion of the International Searching Authority fo PCT/US2006/003504, Jan. 31, 2006, 6 pages.

* cited by examiner

*Primary Examiner*—J. Casimer Jacyna
(74) *Attorney, Agent, or Firm*—Hanley, Flight & Zimmerman, LLC.

(57) ABSTRACT

Split packing followers for use with valves are disclosed. A disclosed packing follower includes a first member having a first portion of a flange and a first portion of a curved wall extending substantially perpendicular from the first portion of the flange to define a first portion of a cylindrical member. The disclosed packing follower further includes a second member separable from the first member. The second member include a second portion of the flange and a second portion of a curved wall extending substantially perpendiculary from the second portion of the flange to define a second portion of the cylindrical member. The first and second member include complementary interlocking structures that are configured to mechanically couple the first and second members to form the packing follower.

14 Claims, 5 Drawing Sheets

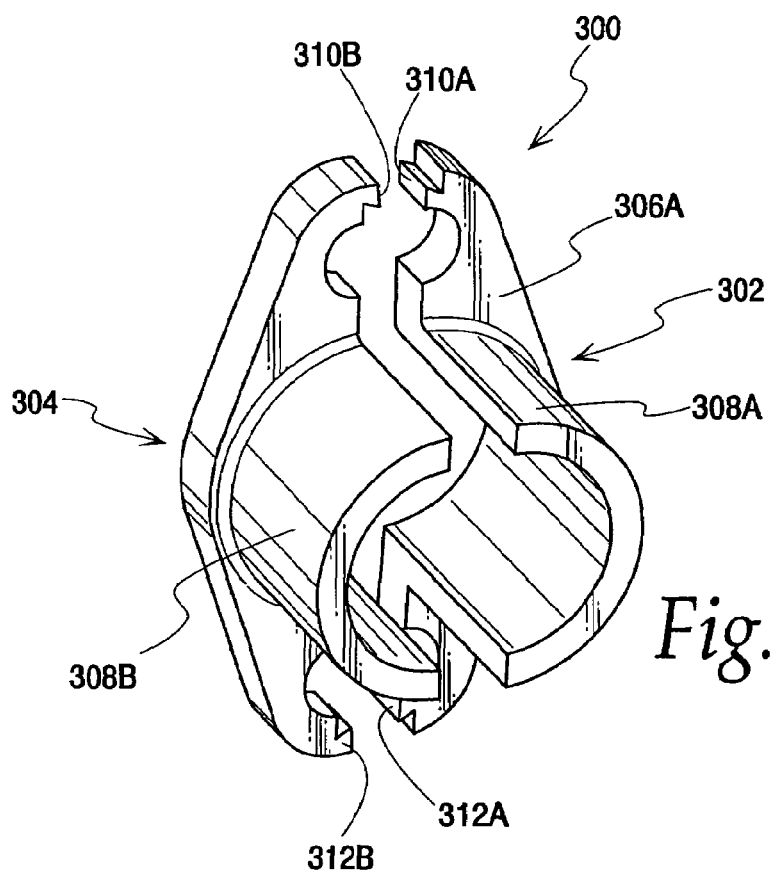
Fig. 3
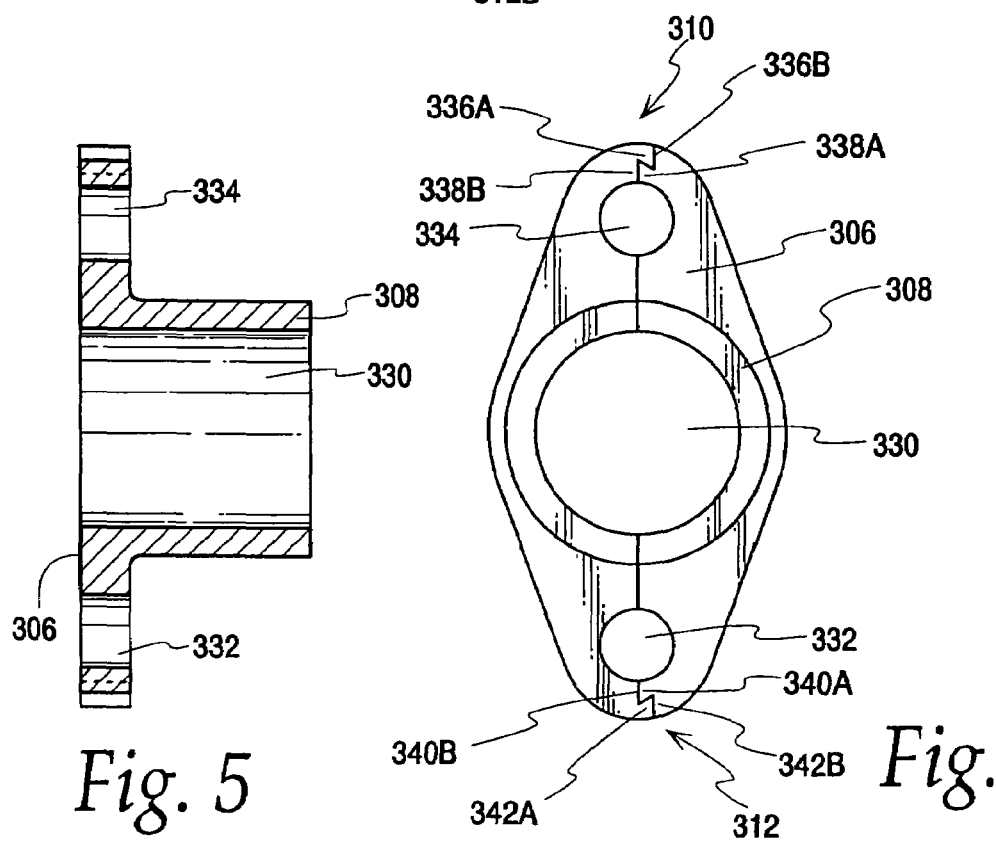
Fig. 5
Fig. 4

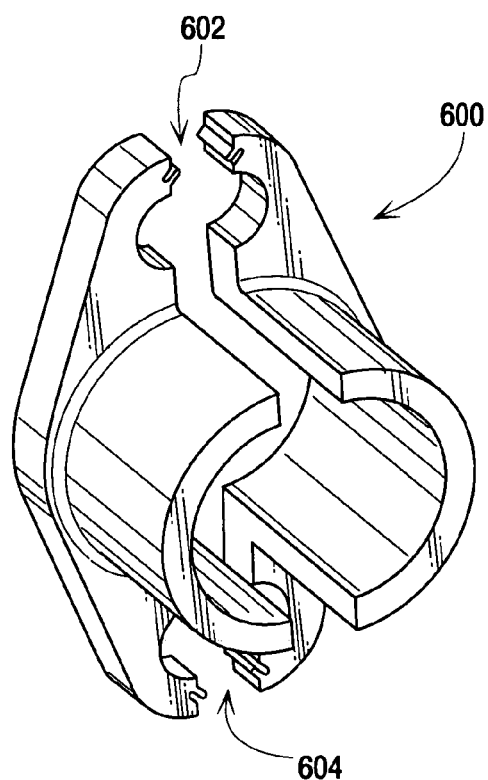
Fig. 6
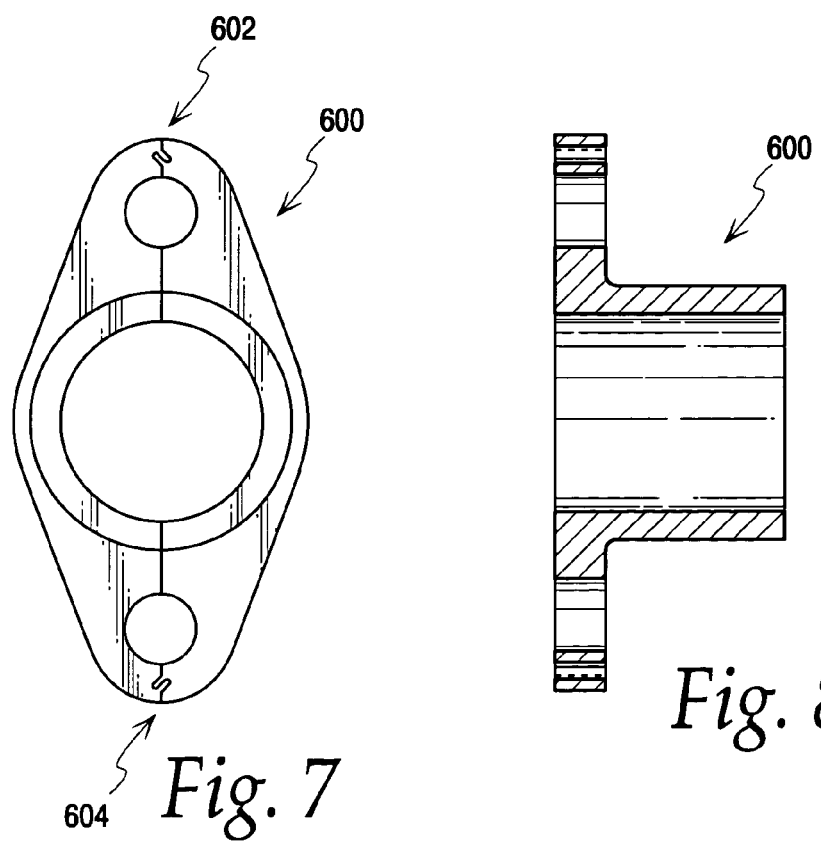
Fig. 7
Fig. 8

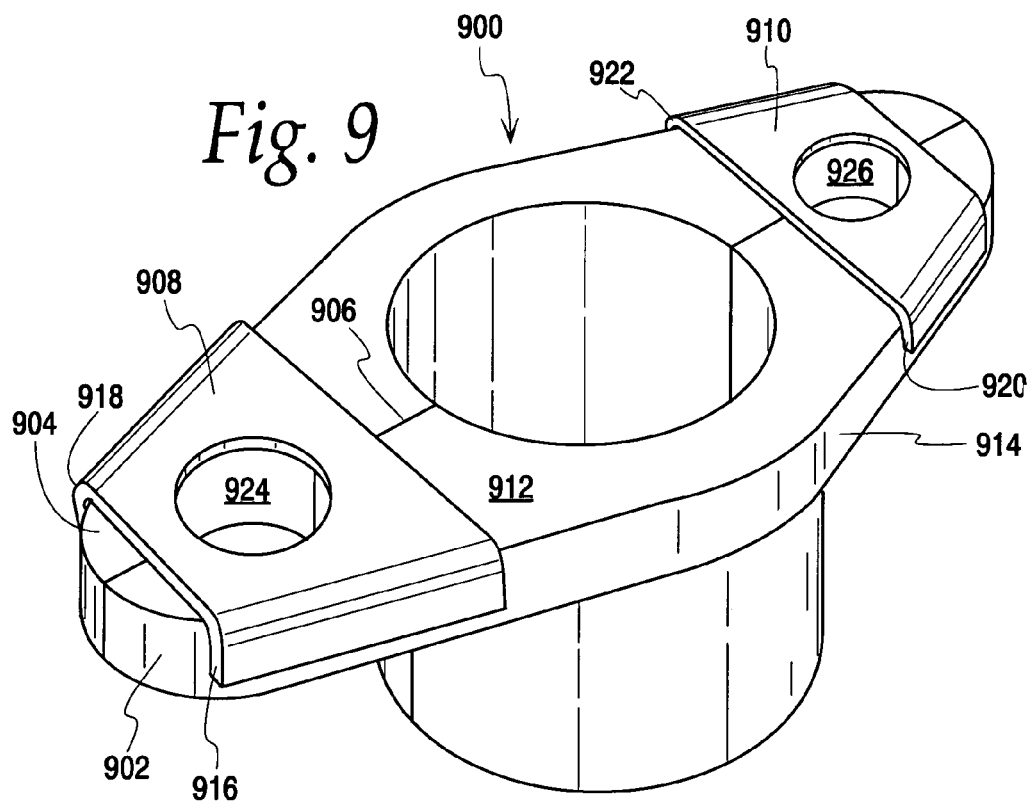
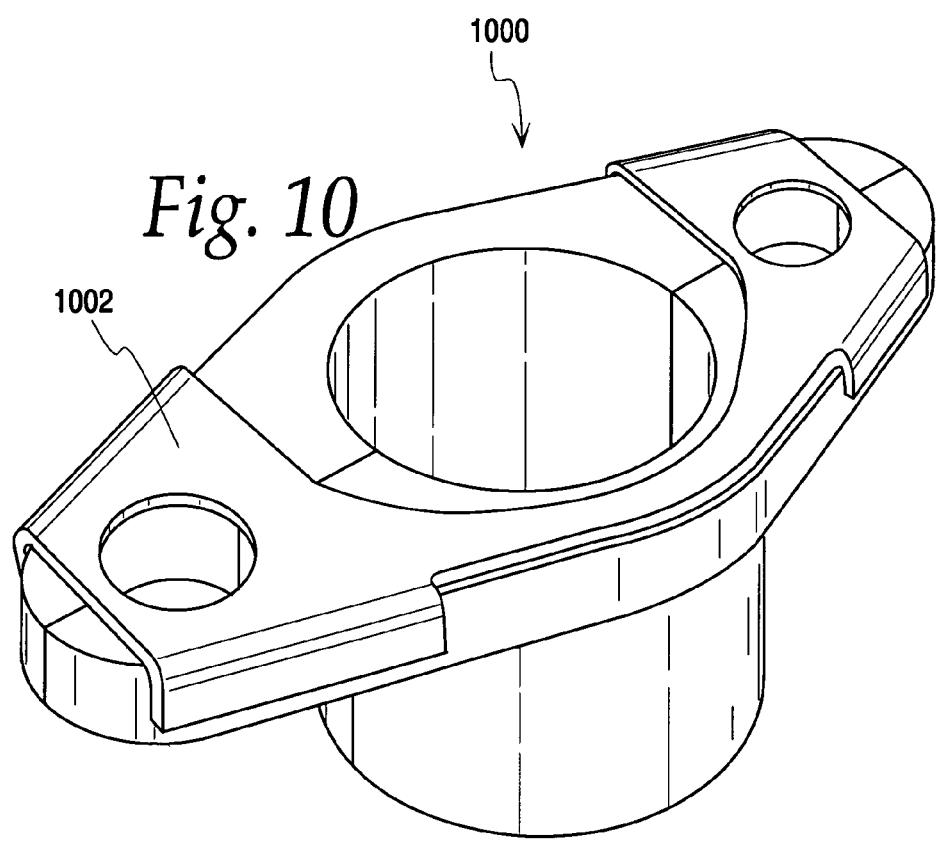

US 7,303,179 B2

SPLIT PACKING FOLLOWER FOR USE WITH VALVES

FIELD OF THE DISCLOSURE

The present disclosure relates generally to valves and, more specifically, to a split packing follower for use with valves.

BACKGROUND

Rotary and sliding stem valves typically including a packing to prevent leakage of process fluid past valve stems or shafts. In particular, the packing surrounds the valve stem or shaft and is typically compressed by a packing follower to ensure that an inner bore of the packing is sealed against the valve stem or shaft and that the outer surface of the packing is sealed against an opening in the valve body or bonnet assembly.

In the case of a sliding stem valve, the valve stem slides against the inner bore of the packing and, in the case of a rotary valve, the valve shaft rotates against the inner bore in the packing. In either case, the movement of the valve stem or shaft against the inner bore of the packing tends to wear the packing, which may ultimately result in leakage of process fluid past the valve stem or shaft and the packing. Although a valve packing can typically be field serviced (e.g., removed and replaced), such service usually requires time consuming and/or difficult removal of the valve actuator and/or other components from the valve because the packing follower is typically installed on and removed from the valve by sliding it over the actuator end of the valve stem or shaft.

BRIEF DESCRIPTION OF THE DRAWINGS

FIG. 3 depicts an isometric view of an example split packing follower.

FIG. 4 is a plan view of the example split packing follower of FIG. 3.

FIG. 5 is a cross-sectional view of the example split packing follower of FIGS. 3 and 4.

FIG. 6 is an isometric view of another example split packing follower.

FIG. 7 is a plan view of the example split packing follower of FIG. 6.

FIG. 8 is a cross-sectional view of the example split packing follower of FIGS. 6 and 7.

FIG. 9 is an isometric view of another example split packing follower.

FIG. 10 is an isometric view of yet another example split packing follower.

SUMMARY

Figure 1:
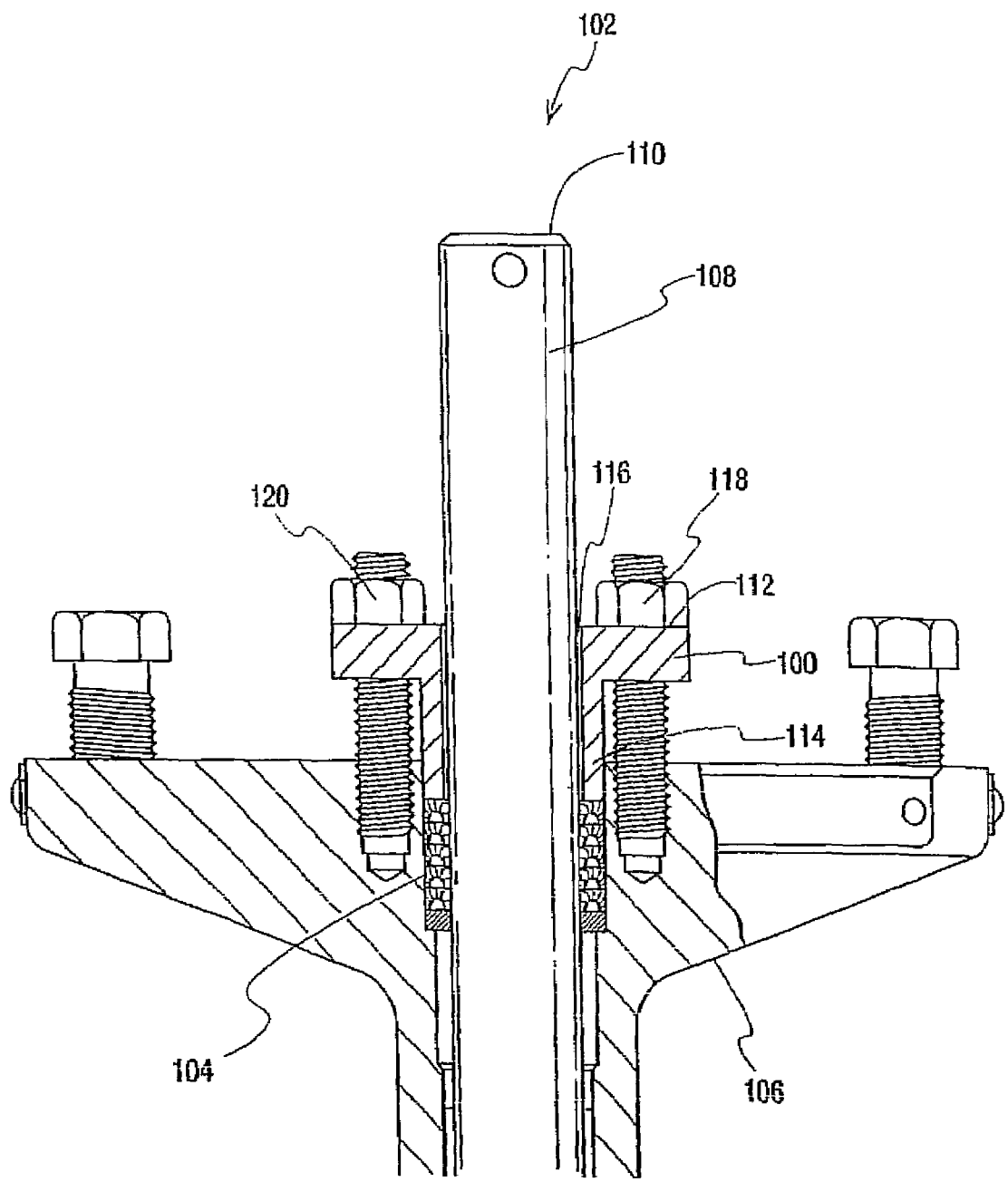
FIG. 1 depicts a cross-sectional view of a known one-piece packing follower used with a rotary valve.

A example packing follower for use with a valve includes a first member having a first portion of a flange and a first portion of a curved wall extending substantially perpendicularly from the first portion of the flange to define a first portion of a cylindrical member. The example packing follower further includes a second member separable from the first member. The second member includes a second portion of the flange and a second portion of a curved wall extending substantially perpendicularly from the second portion of the flange to define a second portion of the cylindrical member. The first and second members include complementary interlocking structures that are configured to mechanically couple the first and second members to form the example packing follower.

DETAILED DESCRIPTION

In general, the example packing followers described herein enable a valve packing to be field serviced (e.g., replaced) without requiring time consuming disconnection of the actuator from the valve and/or any other time consuming or difficult disassembly of the valve and actuator assembly. More specifically, the example packing followers described herein are split so that the packing follower is composed of at least two separable portions or members that can easily removed from or installed on a valve (e.g., removed from or installed on the valve shaft and fasteners attaching the follower to the valve) without having to remove the valve actuator from the valve. Instead, any fasteners or components (e.g., nuts, bolts, etc.) fixing the example followers to a valve may be loosened or removed, the separable portions or members composing the packing follower may then be moved along the stem or shaft to an exposed portion of the stem or shaft and removed therefrom without having to slide the packing follower off the actuator end of the shaft or stem, as is the case with many known packing followers.

The separable portions or members composing some of the example followers described herein include interlocking structures configured to mechanically couple the separable portions or members to form a substantially complete packing follower. In the described examples, the interlocking structures are integral with a flange or flange portions of the packing follower and may include at least one projecting member or structure in one of the flange portions and at least one complementary recess in the other one of the flange portions to receive the at least one projecting member or structure. In one example, the interlocking structures may utilize a dovetail type coupling. In another example, the interlocking structures may utilize S-shaped or curved coupling structures including finger-like projections and complementary receiving recesses.

In the described examples, the packing follower includes a flange portion for attaching the packing follower to the valve and a cylindrical portion configured to extend perpendicularly from the flange portion. The flange includes a central opening and the cylindrical portion has a bore therethrough that is coaxially aligned with the opening in the flange, thereby enabling the flange and cylindrical portion to surround the valve stem or shaft. Each of the flange and the cylindrical portion is split into at least two portions that can be assembled around a valve shaft or stem to form a complete packing follower assembly. The flange and the cylindrical portion may be separate components or may be integrally formed. Additionally or alternatively, the flange and cylindrical portion may be fabricated (e.g., cut from) one or more unitary components. For example, in the case where the flange and cylindrical portion are integral, a unitary follower component may be cut into a plurality (e.g., two) portions (e.g., halves) along a plane that is parallel to the longitudinal axis of the follower.

In some examples, the separable portions composing the packing followers do not include interlocking structures that are integral with the flange portions. Instead, the separable portions are held together using one or more clamping members that span across the separable portions. The clamping members may be configured to have one or more openings that are aligned with the fastener openings provided in the flange. In this manner, the fasteners holding or attaching the packing follower to a valve also serve to hold or fix the clamping members in position on the packing follower.

FIG. 1 depicts a cross-sectional view of a known one-piece packing follower 100 used with a rotary valve 102. As shown in FIG. 1, a packing 104 is disposed within a valve body 106, and a shaft 108 extends through the packing 104 outside the valve to an end 110, which may be coupled to an actuator (not shown). The packing follower 100 is a unitary structure having a flange portion 112 and a cylindrical portion 114 extending perpendicularly from the flange portion 112. A centrally disposed bore or opening 116 extends through the follower 100 and is configured to surround the shaft 108. Fastener assemblies 118 and 120 may pass through openings in the flange (not shown) and into the valve body 106 to attach the packing follower 100 to the valve 102. The fastener assemblies 118 and 120 may be used to adjustably drive the cylindrical portion 114 into the packing 104 to compress the packing 104 and cause the inner and outer walls of the packing 104 to sealingly engage the shaft 108 and the valve body 106, respectively.

To field service (e.g., remove and replace) the packing 104, the fastener assemblies 118 and 120 may be loosened and/or removed (e.g., the nuts may be removed from the studs) and the packing follower 100 may then be removed by sliding it off the end 110 of the shaft 108. However, to slide the follower 100 off the end 110 of the shaft 108, any actuator and/or actuator coupling mechanism attached to the end 110 of the shaft 108 must first be removed. Not only is removing an attached actuator and/or actuator coupling a time consuming process, but such removal may result in disrupting calibration of the actuator/valve assembly.

Figure 2:
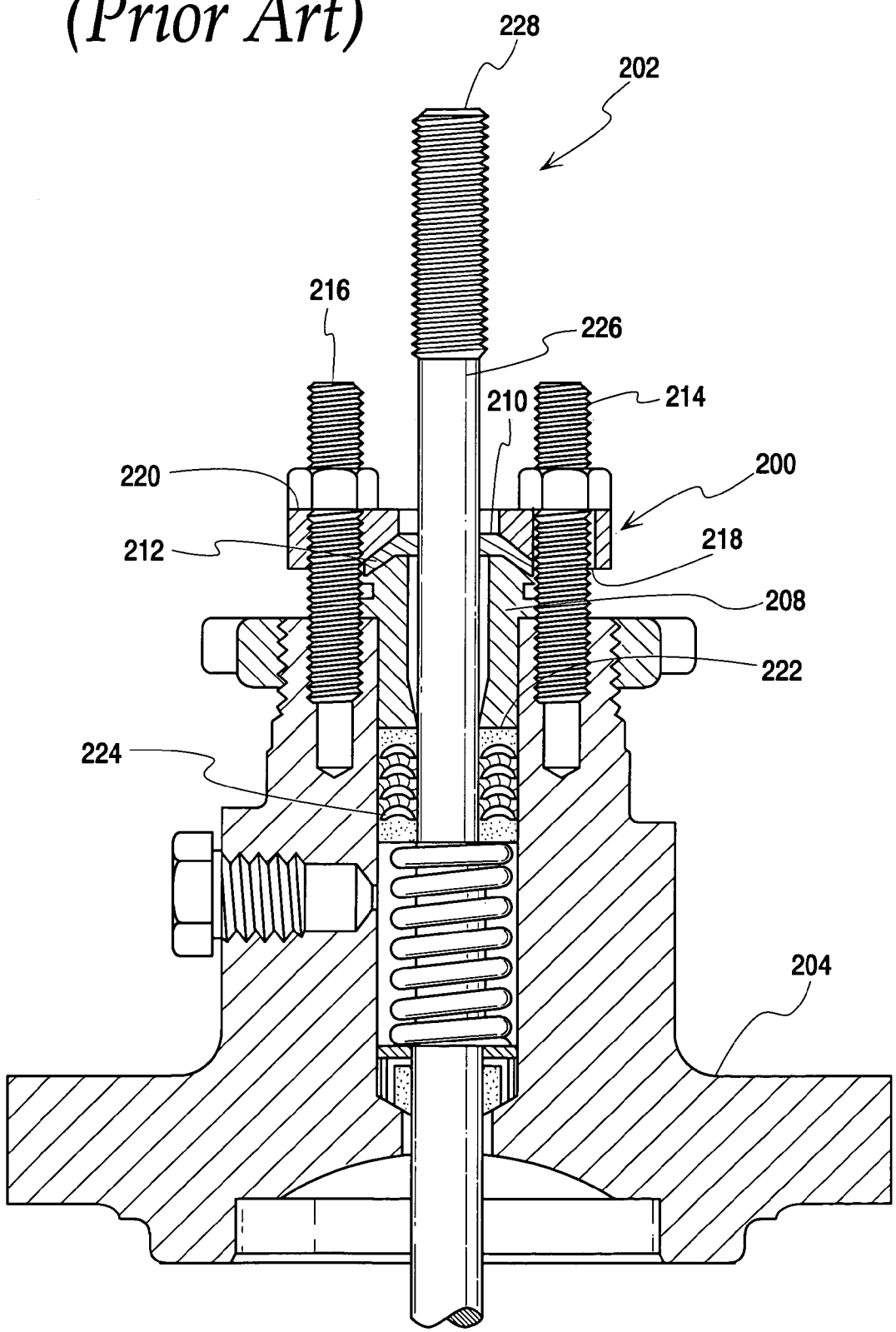
FIG. 2 depicts a cross-sectional view of a known two-piece packing follower used with a sliding stem valve.

FIG. 2 depicts a cross-sectional view of a known two-piece packing follower 200 used with a sliding stem valve 202. For purposes of clarity, only a bonnet assembly 204 of the valve 202 is shown in FIG. 2. As is shown in FIG. 2, the packing follower 200 includes a flange 206 and a cylindrical member 208. The flange 206 includes a concave surface 210 configured to engage a complementary convex surface 212 of the cylindrical member 208. The complementary concave and convex surfaces 210 and 212 facilitate the alignment of the flange 206 and the cylindrical portion 208 with each other and the bonnet assembly 204.

Similar to the fastener assemblies 118 and 120 described in connection with FIG. 1, the fastener assemblies 214 and 216 pass through respective openings 218 and 220 and may be used to adjustably drive the flange 206 against the cylindrical portion 208. As a result, an end 222 of the cylindrical portion 208 is urged or driven against a packing 224 to compress the packing 204 and cause the inner and outer surfaces of the packing 224 to sealingly engage a shaft 226 and an opening in the bonnet assembly 204.

As with the valve assembly 102 of FIG. 1, field service of the packing 224 of the valve 202 may require the fastener assemblies 214 and 216 to be loosened or removed so that the flange 206 and the cylindrical member 208 can be slid off an end 228 of the shaft 226. Thus, field service of the packing 224 may first require disconnection and/or removal of any actuator and/or actuator coupling attached to the end 228 of the shaft 226.

FIG. 3 depicts an isometric view of an example split packing follower 300, FIG. 4 is a plan view of the example split packing follower 300 of FIG. 3, and FIG. 5 is a cross-sectional view of the example split packing follower 300 of FIGS. 3 and 4. As shown in FIGS. 3, 4, and 5, the example packing follower 300 includes first and second portions or members 302 and 304. In the example of FIGS. 3, 4, and 5, each of the first and second portions or member 302 and 304 is substantially one-half of the complete packing follower 300. The first and second portions or members 302 and 304 include respective flange portions 306a and 306b and respective cylindrical wall portions 308a and 308b, which extend perpendicularly from the flange portions 306a and 306b. Each of the flange portions 306a and 306b includes respective complementary interlocking structures 310a, 312a, and 310b, 312b. In particular, the interlocking structures 310a and 310b are configured to interlock to mechanically couple or join the first and second portions 302 and 304. Similarly, the interlocking structures 312a and 312b are also configured to interlock to mechanically couple or join the first and second portions 302 and 304. As described in greater detail in connection with FIG. 4 below, the example interlocking structures 310a, 312a, 312a, and 312b are depicted as having a dovetail type configuration. However, many other possible configurations could be used instead such as, for example, the curved or S-shaped configuration depicted and described below in connection with FIG. 6. In general, the interlocking structures 310a, 312a, 310b, and 312b include at least one projecting member on one of the first and second flange portions 306a and 306b and at least one recess for receiving the at least on projecting member on the other one of the flange portions 306a and 306b.

The interlocking structures 310a, 312a, 310b, and 312b may be located or positioned on the flange portions 306a and 306b to minimize or reduce the bending stresses to which the interlocking structures 310a, 312a, 310b, and 312b are subjected. Additionally, the interlocking structures 310a, 312a, 310b, and 312b may be located on the flange portions 306a and 306b to maximize or increase the structural integrity of the flange portions 306a and 306b. In the example of FIGS. 3, 4, and 5, the interlocking structures 310a, 312a, 310b, and 312b are located between the peripheral edges of the flange portions 306a and 306b and the openings 332 and 334. This location is substantially free of bending stresses typically imparted by fasteners attaching the packing follower 300 to a valve via the openings 332 and 334. Further, because the interlocking structures 310a, 312a, 310b, and 312b are asymmetrical, locating these structures between the peripheral edges of the flange 306 and the openings 332 and 334 moves any asymmetrical component weaknesses introduced by the interlocking structures 310a, 312a, 310b, and 312b to regions of relatively lower stress, thereby reducing the tendency of the flange portions 306a and 306b to become skewed with respect to one another and increasing the overall structural integrity of the follower 300. However, in other examples, the interlocking structures 310a, 312a, 310b, and 312b may be located elsewhere on the flange portions 306a and 306b such as, for example, between the openings 332 and 334 and the cylindrical member 308.

When the first and second portions 302 and 304 are mechanically coupled via, for example, the interlocking structures 310a, 310b, 312a, and 312b, the cylindrical wall portions 308a and 308b form a centrally disposed bore 330 for receiving a valve stem or shaft and opposing openings 332 and 334 for receiving fasteners to fix the follower 300 to a valve. As can be seen most clearly in FIG. 4, the interlocking structures 310 and 312 include projecting members 336a, 338a, 340a, and 342a, and complementary recesses 336b, 338b, 340b, and 342b.

The example packing follower 300 of FIGS. 3, 4, and 5 enables a valve packing to be field serviced without having to remove a valve actuator and/or actuator coupling that may be attached to the end of a valve stem or shaft. In particular, the fasteners fixing or attaching the follower to the valve (e.g., the valves 102 and 202 of FIGS. 1 and 2) may be loosened and/or removed, the packing follower 300 may be moved along the valve stem or shaft to be clear of the valve body or bonnet assembly, and the portions or members 302 and 304 may be separated and removed from valve stem or shaft. Thus, because the example follower 300 is composed of separable portions or members 302 and 304, the example follower 300 can be removed from and installed on a valve stem or shaft at any exposed area along the length of the stem or shaft and, thus, does not have to be slid over the end of the stem or shaft.

The example follower 300 of FIGS. 3, 4, and 5 may be fabricated by cutting a unitary follower component along a plane that is parallel to (and which intersects) the axis of the bore 330. As depicted in the example follower 300, the unitary follower component is cut along its neutral axis, thereby minimizing the effect, if any, that forces associated with fixing or attaching the assembled follower 300 to a valve will have on the integrity of the mechanical coupling of the portions 302 and 304 and operation of the follower. Preferably, a cutting process such as, for example, wire electrical discharge machining (EDM) is used to produce a precise cut having minimal kerf or width so that the resulting portions 302 and 304 can be coupled to provide an assembled part with a sufficient amount of stiffness. The example follower 300 may be made of a zinc plated mild carbon steel, stainless steel, or any other suitable material or combination of materials.

While the example follower 300 of FIGS. 3, 4, and 5 is depicted as having the flange 306 integral with the cylindrical portion 308, the example follower 300 could be modified to have separate flange and cylindrical member components similar to the example follower assembly of FIG. 2, both of which are split to achieve the advantages described in connection with the example follower 300 of FIGS. 3, 4, and 5.

FIG. 6 is an isometric view of another example split packing follower 600, FIG. 7 is a plan view of the example split packing follower 600 of FIG. 6, and FIG. 8 is a cross-sectional view of the example split packing follower 600 of FIGS. 6 and 7. The example follower 600 of FIGS. 6-8 is similar to that described in connection with FIGS. 3-5 except that the example follower 600 utilizes interlocking structures 602 and 604 having a curved or S-shaped profile, which eliminates the sharp corners or edges found in the dovetail coupling of FIGS. 3, 4, and 5. Such curved interlocking structures may reduce the maximum stresses experienced by the interlocking structures 602 and 604 when the follower 600 is attached to a valve. Of course, the interlocking structures described in connection with FIGS. 3-8 are merely examples and a variety of other interlocking structure designs could be used instead to achieve similar or identical results.

FIG. 9 is an isometric view of another example split packing follower 900. The example packing follower 900 includes separable portions 902 and 904 that abut or which lie adjacent to one another along a joint 906. As shown in FIG. 9, clamping members 908 and 910 extend across a face 912 of a flange portion 914 and the joint 906. The clamping members 908 and 910 include retaining edges 916, 918, 920, and 922, which are configured to hold the separable portions 902 and 904 together to form the packing follower 900. Additionally, the clamping members 908 and 910 include respective openings 924 and 926, which are sized to allow fasteners to pass therethrough. The clamping members 908 and 910 may be made of metal (e.g., steel) using a stamping process or any other suitable fabrication process.

As is apparent from FIG. 9, the clamping members 908 and 910 may be used instead of the interlocking structures disclosed in connection with FIGS. 3-8 above. Thus, the separable portions 902 and 904 may be formed by cutting a unitary packing follower into two symmetrical pieces along a substantially flat plane. However, if desired, the clamping members 908 and 910 could be used in addition to interlocking structures such as those shown in FIGS. 3-8.

FIG. 10 is an isometric view of yet another example packing follower 1000. The example packing follower 1000 is similar to that shown in FIG. 9. However, rather than using two clamping members, the example follower 1000 uses a one-piece clamping member 1002, which may facilitate assembly of the packing follower 1000 on a valve.

Although certain apparatus and articles of manufacture have been described herein, the scope of coverage of this patent is not limited thereto. To the contrary, this patent covers all apparatus and articles of manufacture fairly falling within the scope of the appended claims either literally or under the doctrine of equivalents.

What is claimed is:

1. A packing follower for use with a valve, comprising:
  a first member including a first portion of a flange and a first portion of a curved wall extending substantially perpendicularly from the first portion of the flange to define a first portion of a cylindrical member, the first member further including a first portion of an opening of the flange located adjacent to a peripheral edge of the first portion of the flange; and
  a second member separable from the first member and including a second portion of the flange and a second portion of a curved wall extending substantially perpendicularly from the second portion of the flange to define a second portion of the cylindrical member, the second member further including a second portion of the opening of the flange located adjacent to a peripheral edge of the second portion of the flange, wherein the first and second members including complementary s-shaped or dovetail interlocking structures configured to mechanically couple the first and second members to form the flange and the cylindrical member of the packing follower and wherein the complementary s-shaped or dovetail interlocking structures are located between the opening and the peripheral edge of the flange to prevent separation of the first and second members across a plane substantially perpendicular to the valve shaft.

2. A packing follower as defined in claim 1, wherein the first and second portions of the cylindrical member and the flange comprise substantially the entire cylindrical member and flange, respectively.

3. A packing follower as defined in claim 1, wherein each of the first and second members comprises substantially half of the packing follower.

4. A packing follower as defined in claim 1, wherein the first and second members are cut from a unitary packing follower component.

5. A packing follower as defined in claim 1, wherein the complementary interlocking structures comprise at least one projection on one of the first and second members and a complementary recess configured to receive the at least one projection in the other one of the first and second members.

6. A packing follower assembly, comprising:
a flange having first and second mating portions, wherein the first and second mating portions are separable and include s-shaped or dovetail interlocking structures configured to mechanically couple the first and second mating portions, the flange further comprising at least one opening configured to receive a fastener to attach the packing follower to a valve and the s-shaped or dovetail interlocking structures are located between the at least one opening and a peripheral edge of the flange; and
a cylindrical member having first and second halves, wherein the first and second halves are configured to form the cylindrical member, and wherein the cylindrical member is configured to surround a valve shaft and to be urged by the flange into contact with a valve packing.

7. A packing follower assembly as defined in claim 6, wherein each of the first and second mating portions of the flange comprises a half of the flange.

8. A packing follower assembly as defined in claim 6, wherein the interlocking structures include at least one projecting member and a complementary recess configured to receive the projecting member.

9. A packing follower assembly as defined in claim 6, wherein the first and second mating portions of the flange and the first and second halves of the cylindrical member are cut from a unitary packing follower.

10. A packing follower, comprising:
a flange having a first opening for receiving a valve shaft and at least second opening configured to receive a fastener to attach the flange to a valve, wherein the flange includes s-shaped or dovetail interlocking structures located between the at least second opening and a peripheral edge of the flange; and
a cylindrical member having bore therethrough, wherein the cylindrical member is configured to be coaxially aligned with the opening and to receive the valve shaft, and wherein each of the flange and the cylindrical member is separable along a plane substantially parallel to a longitudinal axis of the bore and the opening.

11. A packing follower as defined in claim 10, wherein an end of the cylindrical member is configured to contact a valve packing.

12. A packing follower as defined in claim 10, wherein each of the flange and the cylindrical member comprises two pieces.

13. A packing follower as defined in claim 10, further comprising a clamping member configured to hold separable portions of the packing follower together.

14. A packing follower as defined in claim 13, wherein the clamping member is configured to extend across the flange to hold the separable portions of the packing follower together.

* * * * *

UNITED STATES PATENT AND TRADEMARK OFFICE
CERTIFICATE OF CORRECTION

PATENT NO. : 7,303,179 B2 Page 1 of 1
APPLICATION NO. : 11/083503
DATED : December 4, 2007
INVENTOR(S) : Bush et al.

It is certified that error appears in the above-identified patent and that said Letters Patent is hereby corrected as shown below:

Col. 6, line 45 after "second members" insert --include-- and delete "including".

Signed and Sealed this

Thirteenth Day of May, 2008

JON W. DUDAS
*Director of the United States Patent and Trademark Office*